United States Patent [19]
Ozark et al.

[11] Patent Number: 5,945,465
[45] Date of Patent: Aug. 31, 1999

[54] METHOD FOR POLYMERIZING CONTACT LENSES HAVING UV ABSORBING PROPERTIES

[75] Inventors: Richard M. Ozark, Solvay; Jay F. Künzler, Canandaigua, both of N.Y.

[73] Assignee: Bausch & Lomb Incorporated, Rochester, N.Y.

[21] Appl. No.: 09/079,783

[22] Filed: May 15, 1998

[51] Int. Cl.$^6$ .............................. C08F 226/06; G02C 7/04
[52] U.S. Cl. ..................... 523/106; 523/107; 526/261; 526/316; 264/1.38; 264/2.5
[58] Field of Search ................... 523/106, 107; 526/261, 316; 264/1.38, 2.5

[56] References Cited

U.S. PATENT DOCUMENTS

| | | | |
|---|---|---|---|
| 3,159,646 | 12/1964 | Milionis et al. | 260/308 |
| 3,408,429 | 10/1968 | Wichterle | 264/1 |
| 3,660,545 | 5/1972 | Wichterle | 264/1 |
| 3,761,272 | 9/1973 | Mannens et al. | 96/84 |
| 4,113,224 | 9/1978 | Clark et al. | 249/105 |
| 4,197,266 | 4/1980 | Clark et al. | 264/1 |
| 4,304,895 | 12/1981 | Loshaek | 526/313 |
| 4,486,504 | 12/1984 | Chung | 528/25 |
| 4,528,311 | 7/1985 | Beard et al. | 524/91 |
| 4,716,234 | 12/1987 | Dunks et al. | 548/259 |
| 4,719,248 | 1/1988 | Bambury et al. | 523/108 |
| 4,868,251 | 9/1989 | Reich et al. | 525/281 |
| 4,997,897 | 3/1991 | Melpolder | 526/284 |
| 5,034,461 | 7/1991 | Lai et al. | 525/100 |
| 5,135,965 | 8/1992 | Tahan | 523/106 |
| 5,271,875 | 12/1993 | Appleton et al. | 264/2.3 |
| 5,420,324 | 5/1995 | Lai et al. | 556/419 |
| 5,496,871 | 3/1996 | Lai et al. | 523/107 |
| 5,610,252 | 3/1997 | Bambury et al. | 526/279 |

OTHER PUBLICATIONS

Dr. R. Olson, "UV Absorber Progenitors: Photo–Fries Rearrangements of Sulfonate Esters of Hydroxyphenylbenzotriazoles", Journal of Applied Polymer Science, vol. 28, 1159–1165 (1983).
U.S. application No. 09/079,701, Lai, no date available.
U.S. application No. 09/079/781, Kunzler, no date available.

*Primary Examiner*—Andrew E. C. Merriam
*Attorney, Agent, or Firm*—John E. Thomas; Denis A. Polyn

[57] ABSTRACT

A method for preparing a lens having UV-absorbing properties involves charging to a mold a monomer mixture comprising lens-forming monomers and an essentially non-UV-absorbing compound; exposing the monomer mixture in the mold to a light source including ultraviolet light to cure the monomer mixture and form the lens, whereby the non-UV-absorbing compound converts to a UV-absorbing agent.

12 Claims, No Drawings

METHOD FOR POLYMERIZING CONTACT LENSES HAVING UV ABSORBING PROPERTIES

BACKGROUND OF THE INVENTION

The present invention relates to a method for preparing contact lenses containing an ultraviolet-absorbing agent, and capable of absorbing UV radiation, wherein the lens-forming monomer mixture is cured by exposure to UV light.

Lenses such as contact lenses or intraocular lenses may include a UV-absorbing agent in the lens to absorb light in the ultraviolet region of the spectrum, more particularly, to absorb light in the region of about 200 to 400 nm and, especially, about 290 to 400 nm. Representative UV-absorbing materials for such lens applications are described in U.S. Pat. Nos. 4,304,895 (Loshaek), 4,528,311 (Beard et al.) and 4,719,248 (Bambury et al.).

Generally, such lenses are formed by free radical polymerization of a monomer mixture including desired lens-forming monomers, usually in the presence of heat (thermal polymerization) or a light source (photopolymerization). One particular method for producing contact lenses involves thermal polymerization of the initial monomeric mixture in tubes in a heated water bath to provide rod-shaped articles, which rods are then cut into buttons, the buttons then being lathed into contact lenses; such methods for forming lenses including a UV absorbing agent are illustrated in the aforementioned US Pat. Nos. 4,304,895 (Loshaek) and 4,528,311 (Beard et al.). Other methods involve casting the lenses directly in molds, wherein the monomer mixture is charged to the mold and polymerized by exposure to ultraviolet radiation.

In the case where it is desired to form lenses by a photopolymerization process, UV curing (i.e., exposure of the monomer mixture to radiation mainly in the ultraviolet region) of the monomer mixtures has proved very effective. It is also possible to effect photopolymerization using a light source also including light in the visible region of the spectrum, although light in this region is generally less efficient in effecting polymerization of conventional lens-forming monomer mixtures than UV curing. However, for lenses including a UV absorbing agent, problems are encountered when attempting to cure the monomer mixtures since this agent absorbs UV light, thus diminishing the amount of UV light available to effect polymerization and resulting in effective or uneven curing of the monomer mixture.

Accordingly, it would be desirable to provide a method whereby lenses exhibiting effective UV-absorbing properties can be polymerized by conventional free radical photopolymerization methods. The present invention provides such a method and solves the aforementioned problems.

SUMMARY OF THE INVENTION

This invention provides a method for preparing a lens having UV-absorbing properties, comprising charging to a mold a monomer mixture comprising lens-forming monomers and an essentially non-UV-absorbing compound; exposing the monomer mixture in the mold to a light source including ultraviolet light to cure the monomer mixture and form the lens, whereby the non-UV-absorbing compound converts to a UV-absorbing agent.

Preferably, the lens is a contact lens or an intraocular lens, most preferably a hydrogel contact lens.

Preferred compounds included in the monomer mixture, and which are essentially non-UV absorbing but capable of converting to a UV-absorbing agent, are compounds of the formula:

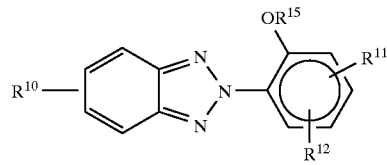

wherein each of $R^{10}$, $R^{11}$ and $R^{12}$ is independently hydrogen or a substituent; and $R^{15}$ is a protective radical that renders the compound essentially non-UV-absorbing.

Especially preferred are compounds of this formula wherein at least one of $R^{11}$ and $R^{12}$ is an ethylenically unsaturated radical of the formula, as well as compounds wherein $-OR^{15}$ is $-OSO_2C_6H_5$.

DETAILED DESCRIPTION OF PREFERRED EMBODIMENTS

The monomer mixtures employed in the invention include conventional lens-forming monomers.

The lens-forming monomers are monomers that are polymerizable by free radical polymerization, generally including an activated unsaturated radical, and most preferably an ethylenically unsaturated radical. (As used herein, the term "monomer" denotes relatively low molecular weight compounds that are polymerizable by free radical polymerization, as well as higher molecular weight compounds that are polymerizable by free radical polymerization and also referred to as "prepolymers", "macromonomers", and related terms.)

An especially preferred class of materials are hydrogel copolymers. A hydrogel is a crosslinked polymeric system that can absorb and retain water in an equilibrium state. Accordingly, for hydrogels, the monomer mixture will typically include at least one hydrophilic monomer and a crosslinking agent (a crosslinker being defined as a monomer having multiple polymerizable functionalities). Suitable hydrophilic monomers include: unsaturated carboxylic acids, such as methacrylic and acrylic acids; acrylic substituted alcohols, such as 2-hydroxyethylmethacrylate and 2-hydroxyethylacrylate; vinyl lactams, such as N-vinyl pyrrolidone; and acrylamides, such as methacrylamide and N,N-dimethylacrylamide. Typical crosslinking agents include polyvinyl, typically di- or tri-vinyl monomers, such as di- or tri(meth)acrylates of diethyleneglycol, triethyleneglycol, butyleneglycol and hexane-1,6-diol; divinylbenzene; and others known in the art.

Another preferred class of lens-forming monomers are those that form silicone hydrogel copolymers. Such systems include, in addition to a hydrophilic monomer, a silicone-containing monomer. One suitable class of silicone containing monomers include known bulky, monofunctional polysiloxanylalkyl monomers represented by Formula (I):

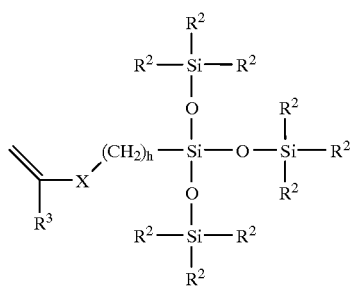

(I)

wherein:

X denotes —COO—, —CONR⁴—, —OCOO—, or —OCONR⁴— where each where R⁴ is H or lower alkyl; R³ denotes hydrogen or methyl; h is 1 to 10; and each R² independently denotes a lower alkyl or halogenated alkyl radical, a phenyl radical or a radical of the formula

wherein each $A^5$ is independently an activated unsaturated group;

each R' is independently a lower alkyl radical or a phenyl radical. Such bulky monomers specifically include methacryloxypropyl tris(trimethylsiloxy)silane, pentamethyldisiloxanyl methylmethacrylate, tris(trimethylsiloxy) methacryloxy propylsilane, methyldi(trimethylsiloxy) methacryloxymethyl silane, 3-[tris(trimethylsiloxy)silyl] propyl vinyl carbamate, and 3-[tris(trimethylsiloxy)silyl] propyl vinyl carbonate.

Another suitable class are multifunctional ethylenically "end-capped" siloxane-containing monomers, especially difunctional monomers represented Formula (II):

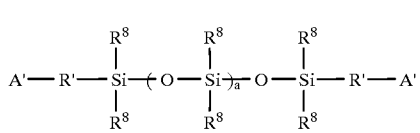

(II)

wherein:

each A' is independently an activated unsaturated group;

each R' is independently are an alkylene group having 1 to 10 carbon atoms wherein the carbon atoms may include ether, urethane or ureido linkages therebetween;

each $R^8$ is independently selected from monovalent hydrocarbon radicals or halogen substituted monovalent hydrocarbon radicals having 1 to 18 carbon atoms which may include ether linkages therebetween, and a is an integer equal to or greater than 1. Preferably, each $R^8$ is independently selected from alkyl groups, phenyl groups and fluoro-substituted alkyl groups. It is further noted that at least one $R^8$ may be a fluoro-substituted alkyl group such as that represented by the formula:

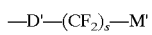

wherein:

D' is an alkylene group having 1 to 10 carbon atoms wherein said carbon atoms may include ether linkages therebetween;

M' is hydrogen, fluorine, or alkyl group but preferably hydrogen; and s is an integer from 1 to 20, preferably 1 to 6.

With respect to A', the term "activated" is used to describe unsaturated groups which include at least one substituent which facilitates free radical polymerization, preferably an ethylenically unsaturated radical. Although a wide variety of such groups may be used, preferably, A' is an ester or amide of (meth)acrylic acid represented by the general formula:

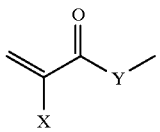

wherein X is preferably hydrogen or methyl, and Y is —O— or —NH—. Examples of other suitable activated unsaturated groups include vinyl carbonates, vinyl carbamates, fumarates, fumaramides, maleates, acrylonitryl, vinyl ether and styryl. Specific examples of monomers of Formula (II) include the following:

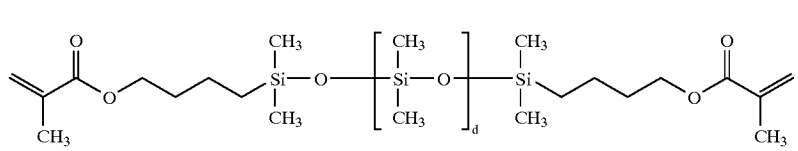

(IIa)

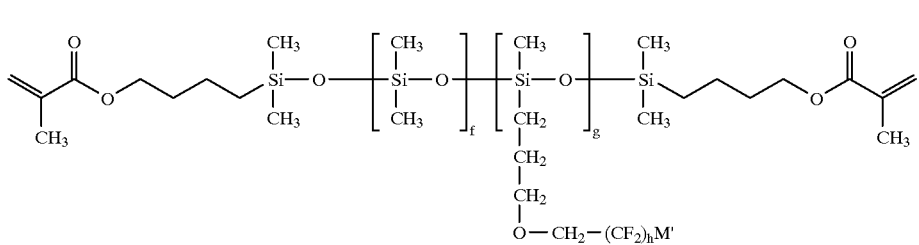

(IIb)

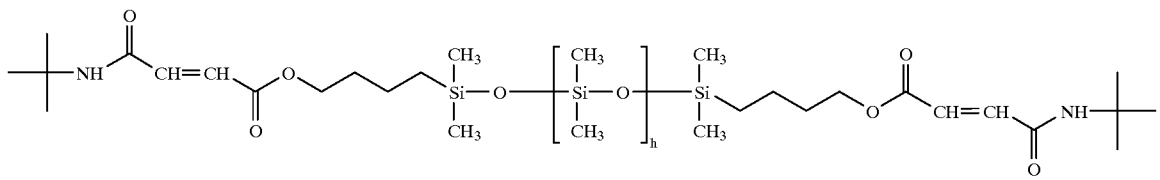

wherein:

d, f, g, h and k range from 0 to 250, preferably from 2 to 100; and

M' is hydrogen or fluorine.

Other silicone-containing monomers include the silicone-containing monomers described in U.S. Pat. Nos. 5,034,461, 5,610,252 and 5,496,871, the disclosures of which are incorporated herein by reference. Many other silicone-containing monomers are well-known in the art.

As mentioned, polymerization (or curing) of monomer mixtures to form lenses by exposure of the monomer mixture to ultraviolet radiation has proved very effective, however, for lenses including a UV-absorbing agent, problems are encountered when attempting to conduct polymerization of the monomer mixture by exposure to ultraviolet radiation since this agent absorbs UV light. The invention provides a method whereby lenses with UV-absorbing properties can be prepared by conventional methods involving UV light-induced free radical polymerization.

More specifically, to the monomer mixture including the lens-forming monomers is added a compound that is essentially non-UV-absorbing but is able to convert to a UV absorbing agent during curing of the monomer mixture, i.e., upon exposure to UV light. As used herein, the term "UV-absorbing agent" denotes an agent that, when incorporated in a film of the lens-forming monomers having a 0.02-mm thickness, is capable of reducing the transmittance of light in the region of 320 to 400 nm to at least 50 percent of a similar sample lacking the UV-absorbing agent, and preferably, to at least 70 percent, most preferably to at least 85 percent. It is also preferred that such a sample incorporating the UV-absorbing agent transmits no more than 70% of light in the region of 320 to 400 nm and no more than 90% of light in the region of 290 to 320 nm. The term "essentially non-UV-absorbing agent" denotes an agent that, if incorporated in such a film sample, is capable of reducing the transmittance of light in the region of 320 to 400 nm to no more than 40 percent of a similar sample lacking this agent (and preferably, no more than that 20 percent).

One preferred class of UV-absorbing agents known for contact lens and intraocular lens applications includes benzotriazoles that containing a phenol moiety. Examples of such benzotriazoles are described in U.S. Pat. Nos. 4,528,311 (Beard et al.), 4,716,234 (Dunks et al.), 4,719,248 (Bambury et al.), 3,159,646 (Milionis et al.) and 3,761,272 (Manneus et al.), the disclosures of which are incorporated herein by reference. Specific examples include 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl)benzotriazole, 2-(2'-hydroxy-5'-methacryloxypropylphenyl)benzotriazole. These benzotriazoles may be represented by the general formula (I):

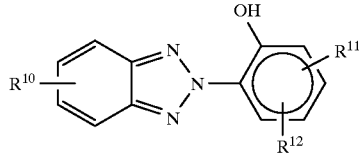

wherein $R^{10}$ may be hydrogen or a substituent (representative substitutents being selected from the group consisting of halogen, $C_1$–$C_4$ alkyl and $C_1$–$C_4$ alkoxy); and each of $R^{11}$ and $R^{12}$ independently may be hydrogen or a substituent (representative substituents being selected from the group consisting of halogen, $C_1$–$C_4$ alkyl and $C_1$–$C_4$ alkoxy). Preferably, at least one of $R^{11}$ or $R^{12}$ is a polymerizable ethylenically unsaturated moiety, such as

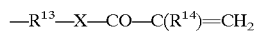

wherein $R^{13}$ is a single bond or $C_1$–$C_{10}$ alkylene, X is —O— or —NH—, and $R^{14}$ is hydrogen or methyl.

The essentially non-UV-absorbing agent that is actually incorporated in the initial monomer mixture, along with the lens-forming monomers, is a derivative of the UV-absorbing agent where the hydroxyl radical of the phenol moiety is replaced with a protective group, such protective group rendering the agent essentially non-UV absorbing (i.e., the protective group essentially shifts the absorption properties of the compound so that the agent does not absorb as strongly in the 320 to 400 nm range). Upon exposure to UV light, the UV light acts as a catalyst for a photo-Fries type rearrangement, where the hydroxyl moiety is regenerated to yield a UV absorbing agent. For the preferred benzotriazoles, the agents that are derivatives of the Formula (I) compounds and that are added to the initial monomer mixture, may be represented by the general formula (Ia):

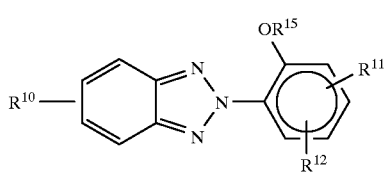

wherein $R^{10}$, $R^{11}$ and $R^{12}$ have the same meanings as for Formula (I) and $R^{15}$ is the protective group that rearranges upon exposure to UV light.

As in Formula (I), preferably, at least one of $R^{11}$ or $R^{12}$ in Formula (Ia) is a polymerizable ethylenically unsaturated moiety, such as

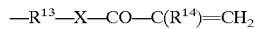

A specific example of the —$OR^{15}$ radical, and the most preferred radical, is —$OSO_2C_6H_5$.

The agents of Formula (Ia) may be prepared by methods generally known in the art. For example, for the preferred protective group —$SO_2C_6H_5$, a compound of Formula (I) can be reacted with $C_6H_5SO_2Cl$ in the presence of triethylamine. A representative detailed synthesis is provided in the examples, below.

For the preferred benzotriazoles of Formula (Ia), the photo-Fries-type rearrangement may be illustrated as follows:

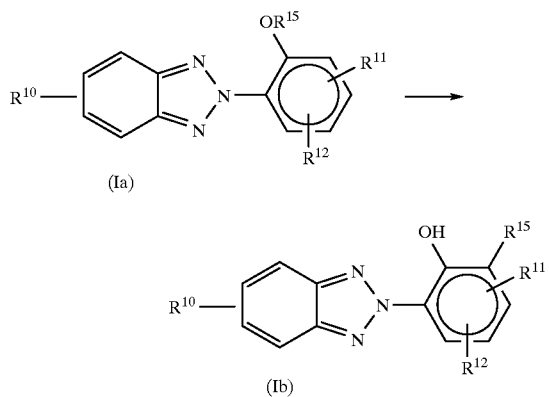

(Ia)

(Ib)

Another representative class of UV-absorbing agents are benzophenone UV-absorbers containing a phenolic radical. Specific examples are 2,2-dihydroxy-4,4-dimethoxy-benzophenone, 2,2-dihydroxy-4-methoxy-benzophenone, and the polymerizable benzophenones described in U.S. Pat. Nos. 4,304,895 (Loshaek) the disclosure of which is incorporated herein by reference. Accordingly, the derivatives of these UV-absorbing agents, that are incorporated in the initial monomer mixture in practice of this invention, are benzophenone derivatives where at least one hydroxyl radical of the phenolic radical is replaced with one of the aforementioned protective groups. Accordingly, for this class of UV-absorbing agents, the photo-Fries-type rearrangement may be illustrated as follows:

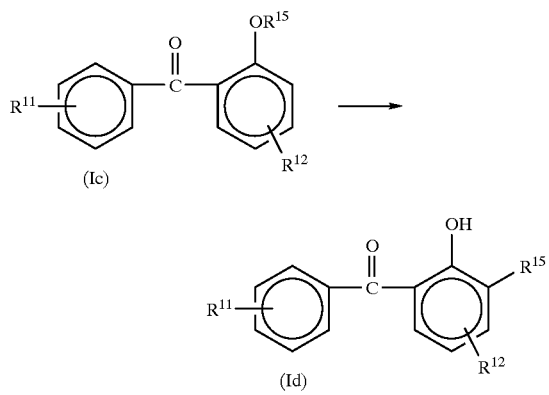

(Ic)

(Id)

with Formula (Ic) representing the agent incorporated in the initial monomer mixture, and $R^{11}$ and $R^{12}$ representing optional substitutents on the benzene ring with meanings as for Formula (I). Compounds of Formula (Ic) can be prepared from the corresponding parent phenol-containing UV-absorbing compounds, for example, for compounds of Formula (Ic) containing the preferred protective group —$SO_2C_6H_5$, the parent phenol-containing benzophenone UV-absorbing compounds can be reacted with $C_6H SO_2Cl$ in the presence of triethylamine.

Especially preferred for contact lens and intraocular lens applications are agents that include a polymerizable ethylenically unsaturated moiety. For example, as mentioned for the benzotriazoles of Formula (Ia), preferred agents include those with at least one ethylenically unsaturated radical. These agents copolymerize with the lens-forming monomers, i.e., the agent forms an integral part of the copolymer network. Surprisingly, it has been found that even though these agents copolymerize with the lens-forming monomers, the agents still undergo the photo-Fries rearrangement upon exposure to UV light to render the resultant lens UV-absorbing.

The agents convertible to UV-absorbing agents will generally be included in the monomer mixture at about 0.1 to about 5 weight percent, more preferably about 0.2 to about 2 weight percent.

The monomer mixtures may further include a tinting agent that imparts some degree of color to the lens. The monomer mixtures will generally include a polymerization initiator, such as commercial acetophenone-based initiators, titanocene-based initiators, and/or aromatic phosphine oxide-based initiators, for example, those available under the Darocur or Irgacur tradenames.

Generally, the monomer mixture, containing the lens-forming monomers and the essentially non-UV-absorbing agent, is charged to a mold, and then subjected to light to effect curing of the monomer mixture in the mold. Various processes are known for curing a monomeric mixture in the production of contact lenses, including spincasting and static casting. Spincasting methods involve charging the monomer mixture to a mold, and spinning the mold in a controlled manner while exposing the monomer mixture to light. Static casting methods involve charging the monomer mixture between two mold sections, one mold section shaped to form the anterior lens surface and the other mold section shaped to form the posterior lens surface, and curing the monomer mixture by exposure to UV light. Such methods are described in U.S. Pat. Nos. 3,408,429, 3,660,545, 4,113,224, 4,197,266, and 5,271,875.

The following examples illustrate various preferred embodiments.

EXAMPLE 1

Synthesis of protected derivative of UV-absorbing agent of Formula (Ia) 2-[3-(2H-benzotriazole-2-yl)-4-benzene sulfonyloxybenzyl]ethyl methacrylate To a 1-liter round-bottom flask equipped with a mechanical stirrer, thermometer, reflux condenser and dropping funnel is added under dry nitrogen 2-[3-2H-benzotriazol-2yl)-4-hydroxyphenyl]ethylmethacrylate (20 g, 0.062 mole), triethylamine (7.1 g, 0.07 mole) and 400 ml chloroform. The reaction mixture is cooled to 5° C at which time benzene sulfonyl chloride (12.01 g, 0.068 mole) is slowly added. After the addition is complete the reaction is allowed to come to room temperature. Stirring is continued for two additional hours. The resultant reaction solution is washed two times with 2N HCl, one time with saturated brine and two times with a 5% solution of 5% sodium bicarbonate. The organic layer is collected and dried over magnesium sulfate, filtered and placed on a rotoevaporator to remove the chloroform. The solid unpurified protected triazole is dissolved in 30 ml methylene chloride and passed through a silica gel column using methylene chloride (450 ml) as eluant followed by a 50/50 methylene chloride/ethyl acetate mixture (450 ml). Six fractions were collected (approx. solvent volume 150 mL/fraction) and solvent was removed. Fractions 1 and 2 contained both starting material and product as determined by thin layer chromatography. Fraction 3, 4, 5 and 6 contained the desired protected triazole (total yield 14 g, mp 86°–88° C.). Molecular structure was confirmed by both FTIR and $^1$H-NMR.

EXAMPLE 2

UV spectra data

The UV spectra of the compound prepared in Example 1 was compared with the UV spectra of its parent compound (a compound of Formula (I), 2-(2'-hydroxy-5'-methacryloxyethylphenyl)benzotriazole)) by diluting each compound in a solvent at a 1:100,000 dilution ratio, and measuring the amount of light absorption. Whereas the parent compound exhibited a sharp absorption peak at about 350 nm, the compound of Example 1 exhibited no such peak, instead having a well-defined absorption peak at about 300 nm, indicating that addition of —OSO$_2$C$_6$H$_5$ protective group was effective at shifting significantly the UV absorbance to a lower wavelength.

EXAMPLE 3

The compound of Example 1 was added at 0.8 weight percent to a monomer mixture of 2-hydroxyethylmethacrylate (Hema), ethyleneglycoldimethacrylate (EGDMA, a crosslinker), benzoin methyl ether (BME, an initiator) and glycerin (a diluent). For comparative purposes, the compound 2-(2'-hydroxy-5'-methacryloxyethylphenyl)benzotriazole) was added at 0.8 weight percent to the same base monomer mixtures. Both resultant mixtures were cast between two glass plates and exposed to UV light (2500 μW/cm$^2$) for one hour. Whereas the mixture containing the compound of Example 1 was effectively polymerized within 3 to 4 minutes to form a film, the comparative mixture, containing the conventional UV-absorbing agent, failed to polymerize.

EXAMPLE 4

The compound of Example 1 was added at 0.4 weight percent and 0.8 weight percent to the same Hema-based monomer mixture described in Example 3. Both resultant mixtures were cast between two glass plates and exposed to UV light (2500 μW/cm$^2$) for one hour.

For comparative purposes, the compound 2-(2'-hydroxy-5'-methacryloxyethylphenyl) benzotriazole) was added at 0.8 weight percent to the same base monomer mixture, cast between two glass plates, and thermally cured.

Light transmittance was measured for each set of films. Comparison of the UV cured films with the thermally cured film indicated that the compound of Example 1 in the UV cured films had at least partially rearranged as its transmittance characteristics approached that of the heat-cured film.

Many other modifications and variations of the present invention are possible to the skilled practitioner in the field in light of the teachings herein. It is therefore understood that, within the scope of the claims, the present invention can be practiced other than as specifically described.

We claim:

1. A method for preparing a lens having UV-absorbing properties comprising:
   charging to a mold a monomer mixture comprising lens-forming monomers and an essentially non-UV-absorbing compound,
   exposing the monomer mixture in the mold to a light source including ultraviolet light to cure the monomer mixture and form the lens, whereby the non-UV-absorbing compound converts to a UV-absorbing agent,
   wherein the essentially non-UV-absorbing compound has the general formula:

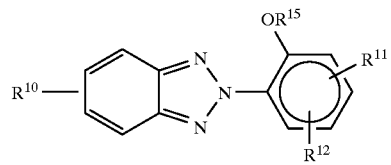

wherein each of $R^{10}$, $R^{11}$ and $R^{12}$ is independently hydrogen or a substituent selected from the group consisting of halogen, $C_1$–$C_4$ alkyl and $C_1$–$C_4$ alkoxy, provided that at least one of $R^{11}$ and $R^{12}$ may be a polymerizable ethylenically unsaturated radical; and
$R^5$ is a protective radical that renders the compound essentially non-UV-absorbing.

2. The method of claim 1, wherein the lens-forming monomers include a hydrophilic monomer and a crosslinking monomer.

3. The method of claim 1, wherein the lens-forming monomers include a hydrophilic monomer and a silicone-containing monomer.

4. The method of claim 1, wherein the monomer mixture includes a polymerization initiator.

5. The method of claim 1, wherein the lens is a contact lens.

6. The method of claim 5, wherein the monomer mixture is cured in a mold cavity formed between a first mold section having a molding surface shaped to provide a posterior contact lens surface and a second mold section having a molding surface shaped to provide an anterior contact lens surface.

7. The method of claim 1, wherein the monomer mixture including the essentially non-UV-absorbing compound absorbs less than 50% of incident light at wavelengths ranging from 320 to 400 nm.

8. The method of claim 7, wherein the essentially non-UV-absorbing compound converts to a UV-absorbing agent such that the formed lens absorbs at least 50% of incident light at wavelengths ranging from 320 to 400 nm.

9. The method of claim 8, wherein the formed lens absorbs at least 70% of light in the region of 320 to 400 nm, and at least 90% of light in the region of 290 to 320 nm.

10. The method of claim 1, wherein at least one of $R^{11}$ and $R^{12}$ is an ethylenically unsaturated radical of the formula

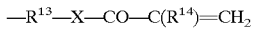

wherein $R^{13}$ is a single bond or $C_1$–$C_{10}$ alkylene, X is —O— or —NH—, and $R^{14}$ is hydrogen or methyl.

11. The method of claim 1, wherein —OR$^{15}$ is —OSO$_2$C$_6$H$_5$.

12. The method of claim 1, wherein exposure to UV light converts the compound of Formula (Ia) to the following:

(Ib)

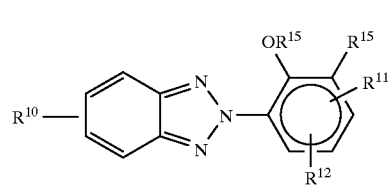

* * * * *

UNITED STATES PATENT AND TRADEMARK OFFICE
CERTIFICATE OF CORRECTION

PATENT NO. : 5,945,465
DATED : August 31, 1999
INVENTOR(S) : Richard M. Ozark, Jay F. Kunzler It is certified that error appears in the above-identified patent and that said Letters Patent is hereby corrected as shown below:

Column 10, line 17, "$R^5$" should read -- $R^{15}$ -- .

Column 10, line 58, in the chemical formula, "$OR^{15}$" should read -- OH -- .

Signed and Sealed this

Eighteenth Day of July, 2000

Attest:

Q. TODD DICKINSON

*Attesting Officer*   *Director of Patents and Trademarks*